United States Patent

Plyler

[15] 3,637,284
[45] Jan. 25, 1972

[54] MALE CONNECTOR TERMINAL FOR FIBER-OPTIC BUNDLES

[72] Inventor: Robert G. Plyler, Niles, Ohio
[73] Assignee: General Motors Corporation, Detroit, Mich.
[22] Filed: Dec. 22, 1969
[21] Appl. No.: 886,879

[52] U.S. Cl. .............................................. 350/96 B, 339/223
[51] Int. Cl. ........................................ H01r 15/04, G02b 5/14
[58] Field of Search ................. 350/96 B; 339/217, 276 T, 223

[56] References Cited

UNITED STATES PATENTS 3,423,581  1/1969  Baer ................................. 350/96 UX
3,465,279  9/1969  Krehbiel ............................ 339/217

FOREIGN PATENTS OR APPLICATIONS 555,836  9/1943  Great Britain ....................... 339/223

Primary Examiner—David Schonberg
Assistant Examiner—Robert L. Sherman
Attorney—W. E. Finken and W. A. Schuetz

[57] ABSTRACT

In a preferred form, this disclosure relates to an end connector for a fiber-optic bundle and to a fiber-optic assembly for transmitting light from a light source to a location remote from the light source. The fiber-optic assembly comprises a lens, a fiber-optic bundle having a surrounding sheath along its longitudinal extent and an end connector which is crimped onto one end portion of the fiber-optic bundle and connected to the lens. The connector is in the form of an axially slit, substantially cylindrical, metal sleeve having a plurality of circumferentially spaced circumferentially elongated slots and with the sleeve along the periphery of the slots having sharp radially inwardly extending burrs which cut into the surrounding sheath of the fiber-optic bundle when the sleeve is crimped thereon.

9 Claims, 6 Drawing Figures

PATENTED JAN 25 1972 3,637,284
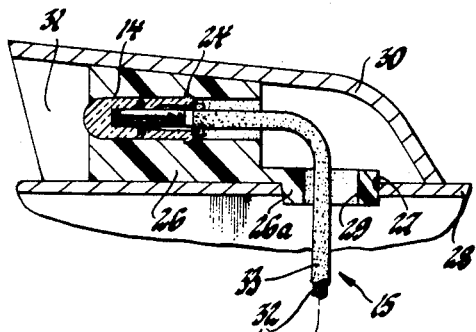
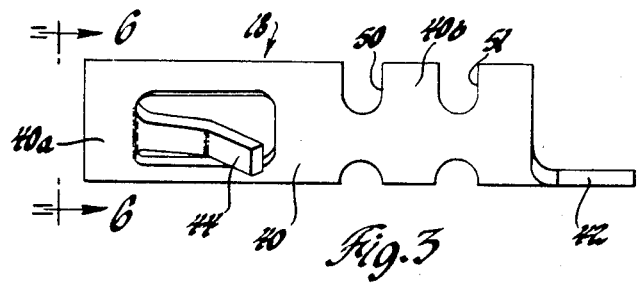
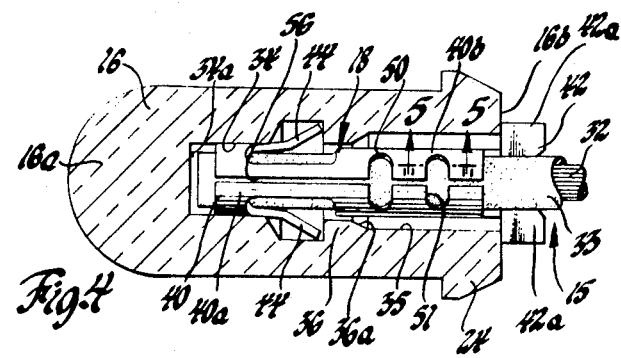
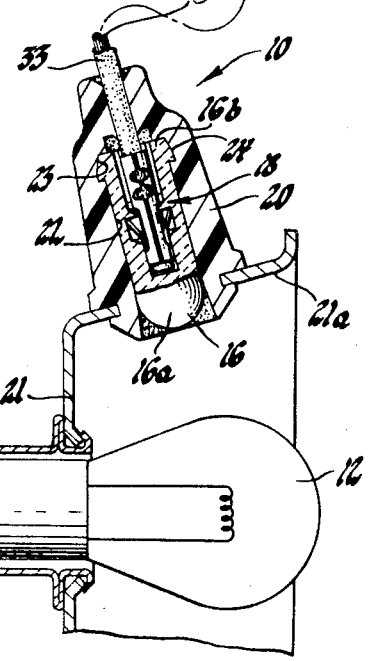
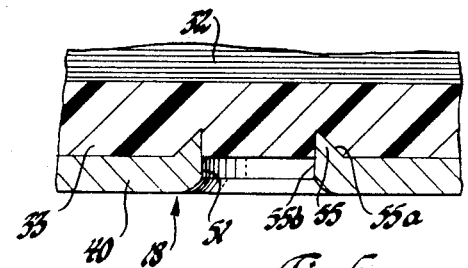
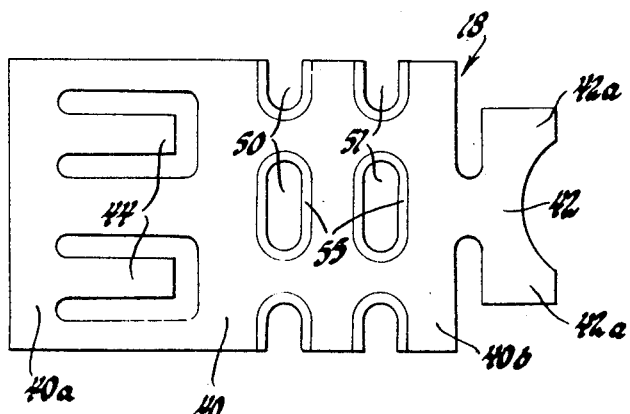
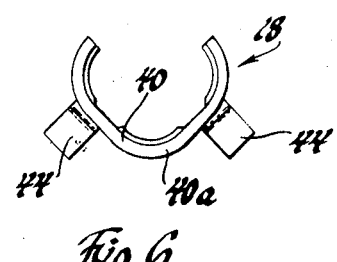
INVENTOR.
Robert G. Plyler
BY
W. A. Schuetz
ATTORNEY

MALE CONNECTOR TERMINAL FOR FIBER OPTIC BUNDLES

The present invention relates to an end connector for a fiber optic bundle, and more particularly to a fiber optic assembly having a connector which is crimpable onto an end of a fiber optic bundle and readily connectable to an associated lens or socket body.

Fiber optic assemblies are used to transmit light from a light source to a location remote from the light source. For example, in automotive vehicle applications they are sued as an indicating means, such as to indicate when a light bulb is burned out, and as a means for illuminating dials, switches, etc.

Fiber optic assemblies usually comprise a fiber optic bundle, plastic lenses or socket bodies positioned adjacent the light source and the remote location to which the light is to be transmitted and end connectors attached to the opposite ends of the fiber optic bundles for connecting the same to the lenses or socket bodies. The fiber optic bundle includes a plurality of plastic or glass fibers or cores, each of which is coated with a substance having a lower light refraction index then the fiber or core, and an opaque flexible outer sheath or jacket, usually made of plastic, surrounding the fiber or cores for protecting the same.

Providing suitable, low-cost, crimpable end connectors for fiber optic bundles which meet required design criteria and which can be readily connected to associated lenses has presented some difficulties. These criteria are (1) the end connector, when crimped onto the fiber optic bundle, must be able to withstand normal axial thrust loads during assembly, disassembly and normal use without coming off the plastic sheath and (2) the radial pressure exerted on the bundle by the connector must be kept at a minimum because radial pressure exerted against the fiber cores effects the light transmitting capabilities of the fiber optic bundle.

Heretofore, ferrule-type end connectors which were crimpable onto the fiber optic bundle and which had an inwardly directed dart which penetrated the sheath have been employed. Such a connector is shown in U.S. Pat. No. 3,423,581 issued Jan. 21, 1969 assigned to the same assignee as the present invention. Although this type of connector has been very satisfactory in use, it cannot be mass produced in reel form and is relatively expensive as compared to a connector which can be made from flat metal stock in reel from and subsequently individually severed from the reel when used. Another type of crimpable connector has been a longitudinally slit sleeve with round holes therethrough. This type of connector when crimped onto the sheath of the fiber optic bundle causes portions of the sheath of the bundle to be received in the hole. This type of connector presents crimping control difficulties, since if it is overcrimped it will exert too much radial pressure and cause a light transmitting loss and if undercrimped, it can be readily pulled off the bundle.

The present invention produces a novel end connector which is crimpable onto a fiber optic bundle, which can withstand relatively high-axial thrust loads without coming or stripping off the plastic sheath of the fiber optic bundle and which exerts no or only a minimal amount of radial pressure on the bundle of fibers or cores so as to not effect the light transmitting capability of the fiber optic bundle. Moreover, the connector of the present invention is very economical in that it can be made from flat metal stock, can be mass produced in reel from and is readily connectable to an associated lens.

Accordingly, an object of the present invention is to provide a new and improved connector for fiber optic bundles which is of a relatively simple and economical construction, can be made from flat strip stock, produced in reel form, and which is so constructed and arranged that, when crimped onto the fiber optic bundle, it can withstand relatively high-axial thrust loads without coming or stripping off the outer sheath of the fiber optic bundle and at the same time exert little or no radial pressure on the fiber cores of the fiber optic bundle so that the light transmitting capabilities of the fiber optic bundle is not adversely affected.

Another object of the present invention is to provide a new and improved connector which is adapted to be crimped onto an outer flexible sheath surrounding fiber optic cores, and in which the connector has a body portion that is generally U-shaped, as viewed in end elevation, a plurality of peripherally spaced openings therethrough, preferably peripherally elongated slots, and inwardly extending sharp or pointed burrs along the periphery of the openings, the burrs having an inward extent which is approximately one-half the radial thickness of the outer sheath of the fiber optic bundle, and wherein the burrs of the connector cut into the sheath of the fiber optic bundle as the connector is being crimped thereon to securely retain the connector on the sheath.

A further object of the present invention is to provide a new and improved fiber optic assembly comprising a lens, a fiber optic bundle having an outer flexible sheath and a connector crimped onto an end portion of the fiber optic bundle and which is adapted to connect the fiber optic bundle to the lens, and wherein the connector is in the form of an axially slit thin metal sleeve when crimped onto the end portion of the fiber optic bundle, the sleeve having a plurality of circumferentially spaced openings, preferably circumferentially elongated slots whose circumferential extent exceeds 50 percent of the circumference of the metal sleeve, and sharp or pointed radially inwardly extending burrs along the periphery of the openings and whose adjacent sides form an acute included angle, preferably 45° or less, therebetween, and wherein the burrs of the sleeve as the sleeve is being crimped onto the fiber optic bundle cut into the sheath so that the connector is securely connected to the sheath against relative axial movement while exerting little or no radial pressure on the bundle so that the light transmitting capabilities are not adversely affected.

Yet another object of the present invention is to provide a new and improved fiber optic assembly, as defined in the next preceding object, in which the thin metal sleeve includes outwardly extending deflectable locking tangs for locking the connector in place when the latter is received in a complementary shaped opening of the lens.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 shows a fiber optic assembly embodying the present invention and illustrates its use as an indicating means for indicating when a lamp bulb is on or not;

FIG. 2 shows the connector of the present invention in its flat stamped out condition;

FIG. 3 shows the connector of the present invention in its formed condition prior to being crimped onto a fiber optic bundle;

FIG. 4 shows the end connector of the present invention crimped onto the fiber optic bundle and connected to its associated lens;

FIG. 5 is an enlarged fragmentary sectional view taken approximately along line 5—5 of FIG. 4; and FIG. 6 is an end elevational view looking in the direction of the arrow 6—6 of FIG. 3.

The present invention provides a novel end connector for fiber optic bundles, and in particular to a novel fiber optic assembly having an end connector which is crimped onto an end of the fiber optic bundle and which is connectable to an associated lens or socket body. Although the fiber optic assembly of the present invention could be used in any application wherein it is desired to transmit light from a light source to a remote location, it is herein shown and described, for the purposes of illustration, as being used to indicate when a lamp bulb is on and off.

As representing a preferred embodiment of the present invention, FIG. 1 of the drawings shows a fiber optic assembly 10 and the manner in which the fiber optic assembly 10 is used to transmit light emanating from a lamp bulb 12 of an automotive vehicle to a viewable lens 14 mounted on the vehicle at a location remote from the lamp bulb 12. The fiber optic assembly 10 comprises, in general, a fiber optic bundle 15, a pair of lenses 16 and 14 respectively positioned adjacent the lamp bulb 12 and the remote location and end connectors 18 which are adapted to be crimped onto the opposite ends of the fiber optic bundle 15 and connected to their associated lenses 16 and 14.

The lens 16 is supported by a resilient lens receiving housing 20, which in turn is suitably secured to an annular sidewall 21a of a lamp housing 21 containing the lamp bulb 12. The resilient lamp receiving housing 20 has a central opening 22 in communication with the interior of the lamp housing 21. The opening 22 extends through the housing 20 and is in communication with an annular radially outwardly extending recess 23 intermediate its ends. The lens 16 is made from a suitable plastic material. The lens 16 is generally cylindrical in shape and has a rounded forward end 16a and a rearward end 16b provided with a radially outwardly extending flange 24. The lens 16 is secured to its housing 20 by force fitting the lens rearward end first through the opening 22 until the flange 24 is positioned within the groove 23 whereupon the resilient housing 20 will contract around the lens 16 to securely hold it in place.

The lens 14 is of an identical construction to the lens 16 and is secured within a resilient lens receiving housing 26 in the same manner as the lens 16 is received within its lens receiving housing 20. The resilient lens receiving housing 26 includes a portion 26a which is press fitted within an opening 27 in the top of a fender 28 of the automotive vehicle. The portion 26a has a through opening 29 therethrough through which the fiber optic bundle 15 is adapted to pass. The vehicle (not shown) also preferably has a hood or shroud 30 surrounding the lens receiving housing 26 and with the hood 30 having a forward opening 31 facing rearwardly of the vehicle so as to enable the operator of the vehicle to view the lens 14.

The fiber optic assembly 10 serves to transmit light emanating from the lamp bulb 12, when the latter is on, to the lens 14 to enable the operator of the vehicle to tell whether the lamp bulb is on.

The fiber optic assembly 15 can be of any suitable or conventional construction and preferably comprises a plurality of light transmitting plastic or glass fibers or cores 12 which are individually surrounded by a substance having a lower light refraction index than the fibers or cores. Surrounding or encasing the plurality of fibers and cores throughout their length is a flexible outer sheath or jacket 33, preferably made from a plastic material.

Since the lenses 14 and 16 are of an identical construction, only the lens 16 shown in FIG. 4 will be further described in detail. As noted hereinabove, the lens 16 is generally cylindrical in shape and has a central opening 34 therein extending from its rearward end 16b toward its forward end 16a. The opening 34 is generally cylindrical, as viewed in cross section, and is in communication with axially and radially outwardly extending recesses 35 at diametral opposite locations. Intermediate the opposite end of the recesses 35 are inwardly extending abutments 37 integral with the lens 16, the abutments 36 having tapered ramp surfaces 36a facing rearwardly of the lens 16. The lenses 16 and 14 are adapted to receive the end connectors 18 crimped onto the ends of the fiber optic bundles 15 to secure the latter to the lens, and in a manner to be hereinafter more fully described.

The end connectors 18 for connecting the fiber optic bundle 15 to its associated lenses 16 and 14 comprises a one piece, thin metal member which is adapted to be stamped from strip stock. The strip stock is initially cut and stamped to the configuration shown in FIG. 2, and then bent or stamped to the configuration shown in FIG. 3. The stamping and forming of the connectors 18 to the configurations shown in FIGS. 2 and 3 can be performed by any suitable punch and die apparatus, and in a manner well-known to those skilled in the art. Although only a single connector is shown in FIG. 2, it will, of course, be understood that the connectors would be stamped out on flat bar stock and rolled up in reel form and that the individual connectors would later be individually severed from the reel during the crimping operation, and in a manner well known to those skilled in the art. During the crimping operation carrier strips interconnecting adjacent connectors would be severed and removed as scrap material.

The connector as shown in FIGS. 3 and 6 is substantially U-shaped, as viewed in end elevation, and comprises a forward main body portion 40 and a rearward tang portion 42. The body portion 40 includes a forward section 40a and a rearward section 40b. The forward section 40a includes a pair of peripherally spaced radially outwardly extending locking tangs 44. These locking tangs are stamped out of the flat strip stock, as show in FIG. 2, and then bent outwardly when the connector body is formed to the shape shown in FIG. 3.

The rearward section 40b of the main 55, portion 40 includes two axially spaced rows of openings 50 and 51. The openings 50 and 51 in each row are peripherally or circumferentially spaced and are in the form of circumferentially or peripherally elongated slots. The body portion 40 at and along the entire peripheral edges of the slots 50 and 51 are inwardly upset to provide pointed or sharp radially inwardly extending burrs 55. The burrs 55 have intersecting sides 55a and 55b which define an acute included angle therebetween, preferably an angle of 45° or less. The extent of the burrs 55 as measured circumferentially of the sleeve, for each row of openings exceeds the circumference of the sleeve when crimped onto the fiber optic bundle 15.

The end connector 18 is adapted to be crimped onto the end of the fiber optic bundle 15. The end of the fiber optic bundle 15 is laid within the U-shaped body portion 40 of the connector 18 and then the connector is rolled or crimped onto the end of the fiber optic bundle 15. When the connector 18 is crimped onto the fiber optic bundle 15 it assumes a cylindrical or substantially cylindrical shape having an axially extending slit 56.

As the connector 18 is being crimped onto the end of the fiber optic bundle 15, the sharp burrs 55 along the peripheral edges of the openings 50 and 51 will cut into the outer sheath of the fiber optic bundle, as shown in FIG. 5. By cutting into the outer plastic sheath of the fiber optic bundle, the burrs function to securely retain the connector 18 against relative axial movement with respect to the fiber optic bundle 15, while creating little or no radial pressure against the individual fibers or cores of the fiber optic bundle 15. By minimizing such radially inwardly directed pressure, the light transmitting capabilities of the fiber optic bundle 15 is not adversely affected.

In order to achieve the above noted cutting action, the burrs must be sharply pointed and cut to a radial depth which is approximately one-half the radial thickness of the sheath onto which it is being crimped. By way of example, it has been found that in automotive applications wherein fiber optic bundles of 16 to 48 fibers are used for light transmitting purposes and which have a plastic sheath of approximately the thickness of twenty thousands of an inch, that the burrs should extend radially inwardly an extent between 0.00 and 0.012 inches. It has also been found that greater holding power against axial thrust loads can be achieved by increasing the circumferential extent of the burrs. In the preferred embodiment, the two rows of openings define in effect four circumferential lines of burrs whose total circumferential extent exceeds twice the circumference of the metal sleeve connector.

The connectors 18 after being crimped onto the opposite ends of the fiber optic bundle are adapted to be connected to their lenses 14 and 16 so as to secure the fiber optic bundle 15 in place. The connectors 18 are connected to their respective lenses 14, 16 by inserting the same into the opening 34 therein and with the connectors 18 being oriented so that the outwardly extending locking tangs 44 are received within the grooves 35. The locking tangs 44 as they are being received within the grooves 35 are deflected radially inwardly from their outer normal position upon engaging the ramp surface 36a of the abutments 36. As the connector 18 is further inserted into the opening 34 the locking tangs 44 ride over the abutments 36 until they are positioned behind the abutments 36 wherein their self-biasing forces return the locking tangs toward their outer normal position in which they are disposed behind the abutment 36, as shown in FIG. 4. This secures the end connector 18 of the fiber optic assembly 10 from movement rearwardly relative to the lenses 14 and 16.

To prevent overinsertion of the connector 18 into the opening 34 of either the lenses 14 and 16 the tang portion 42 respectively engages the rearward end faces 14 and 16b thereof. The tang portion 42 is a flat portion which extends tangentially of the body portion 40 when the latter is crimped into the form of a sleeve about the ends of the fiber optic bundles 15 and its laterally extending wings 42a engage the rearward end face of the lenses 14, 16. This latter feature is important to prevent the forward end face of the fiber optic bundle from being moved into engagement with the lenses at the inner end 34a of the opening 34. Any such engagement could damage the end face of the fiber optic bundles and thus, adversely affect their light transmitting capabilities.

From the foregoing, it can be seen that a novel connector for a fiber optic bundle of a fiber optic assembly have been provided. It can be further seen that the connectors can be formed from flat stripe stock in reel form and individually crimped about the ends of the fiber optic bundles. It can also be seen that the construction and arrangement of the connectors is such that when it is crimped onto the fiber optic bundle it can withstand relatively high axial thrust loads while at the same time not adversely affecting the light transmitting capabilities of the fiber optic bundles.

Although the illustrated embodiment thereof has been described in great detail, it should be apparent that certain modifications, changes, and adaptations may be made in the illustrated embodiment, and that it is intended to cover all such modifications, changes and adaptations which come within the scope of the appended claims.

What is claimed is:

1. A connector for connecting a fiber optic bundle having an outer flexible sheath of a given radial thickness to a socket body or lens comprising: a one-piece, thin, metallic member having a main body portion which is generally U-shaped, as viewed in end elevation, said body portion having a plurality of peripherally spaced openings therethrough, said body portion along the periphery of said openings having pointed radially inwardly extending burrs and with the combined peripheral extent of said burrs being equal to at least the peripheral extent of the periphery of said body portion, said body portion being adapted to be crimped onto the sheath of the fiber optic bundle and forming an axially slit, substantially cylindrical sleeve when crimped onto said sheath, said pointed inwardly extending burrs along the peripheries of the openings having a radial inward extent which is less than the given thickness of the sheath of the fiber optic bundle to which they are adapted to be crimped, said burrs cutting into the sheath of the fiber optic bundle when the connector is being crimped thereon to securely retain the connector thereon and without exerting any significant radial pressure on the fiber optic bundle so that light transmission therethrough is maximized.

2. A connector for connecting a fiber optic bundle having an outer flexible sheath of a given radial thickness to a lens or socket body comprising: a one-piece, thin metallic member stamped and formed from flat strip stock, said metallic member comprising a main body portion which is generally U-shaped, as viewed in end elevation, said body portion having a plurality of peripherally spaced openings therein and sharp radially inwardly extending burrs extending along the peripheries of said openings, the radial extent of said burrs being approximately one-half the given radial thickness of the sheath of the fiber optic bundle, said body portion being adapted to be crimped onto the sheath of the fiber optic bundle and being in the form of an axially slit, cylindrical sleeve when crimped thereon, said radially inwardly extending burrs along the peripheries of said openings cutting into the sheath of the fiber optic bundle when crimped thereon to securely retain said connector thereon and without exerting any significant radial pressure on the fiber optic bundle so that light transmission therethrough is maximized.

3. A fiber optic assembly comprising a fiber optic bundle having the surrounding sheath of a given radial thickness and an end connector crimped onto an end portion of the bundle and which is adapted to connect the fiber optic bundle to an associated lens having an opening therein for receiving said connector, said connector comprising an axially slit thin metal sleeve surrounding said end portion when crimped thereon, said sleeve having a plurality of circumferentially spaced circumferentially elongated slots and with the circumferential extent of the slots being at least 50 percent of the circumference of the sleeve, said sleeve having pointed, radially inwardly extending burrs along the peripheries of said slots with the radial extent of said burrs being approximately one-half the given radial thickness of the sheath of the fiber optic bundle, said burrs when said sleeve is crimped onto said fiber optic bundle cutting into said sheath whereby said connector is securely connected to said sheath against relative axial movement and without exerting any significant radial pressure on said fiber optic bundle so that light transmission therethrough is maximized.

4. A fiber optic assembly as defined in claim 3 wherein said burrs have sides which define an included angle of approximately 45°.

5. A fiber optic assembly as defined in claim 3 wherein said sleeve has axially spaced rows of circumferentially elongated, circumferentially extending slots.

6. A fiber optic assembly as defined in claim 3 wherein said connector has a flange means extending tangentially of said sleeve at its rearward end and which is adapted to engage the associated lens at its rearward end to prevent overinsertion of said connector in said lens.

7. A fiber optic assembly for transmitting light from a light source to a location remote from the light source comprising a lens having a forward and rearward end and an opening extending from said rearward end toward said forward end, said opening having at least one radially outwardly extending recess and said socket body having a radially inwardly extending abutment located in said recess intermediate its opposite ends; a fiber optic bundle having a surrounding plastic sheath of a given radial thickness along its longitudinal extent and an end connector crimped onto one end portion of said bundle and which is connected to said lens, said end connector comprising an axially slit, substantially cylindrical, thin metal sleeve, said sleeve having a radially outwardly extending deflectable locking tang which is self-biased toward an outer normal position, said locking tang being receivable in said recess of said lens and being deflectable radially inwardly from its outer position upon engaging the abutment as said connector is inserted in said opening of said socket body until it clears the abutment whereupon its self biasing forces return the tang toward its outer normal position behind the abutment to connect the fiber optic bundle to said socket body, said sleeve intermediate its ends having a plurality of circumferentially spaced, circumferentially elongated slots and with the circumferential extent of the slots being at least a major portion of the circumference of the sleeve, said sleeve having pointed radially inwardly extending burrs along the periphery of the slots and with the radial extent of the burrs being approximately one-half the given radial thickness of the sheath of the fiber optic bundle, said burrs when said sleeve is crimped onto said bundle cutting into said sheath whereby said connector is securely connected to said sheath against relative axial movement and without exerting any significant radial pressure on said bundle so that light transmission therethrough is maximized, said connector also having a transversely extending tang portion at its rearward end which is adapted to engage the lens at its rearward end to prevent overinsertion of said connector within said socket body.

8. A fiber optic assembly as defined in claim 7 wherein said given radial thickness of said sheath is approximately 0.020 inches and wherein the radial extent of said burrs is between 0.008 and 0.012 inches.

9. A fiber optic assembly as defined in claim 8 wherein said sleeve has axially spaced rows of said openings, wherein said openings are peripherally elongated slots and wherein the combined peripherally extending extent of said burrs is more than twice the circumference of the sleeve.

* * * * *